Dec. 30, 1941.  V. G. TICE  2,267,960
MEASURING DEVICE
Filed Nov. 2, 1940  2 Sheets-Sheet 1

INVENTOR
Vallie G. Tice
BY
ATTORNEY

Dec. 30, 1941.   V. G. TICE   2,267,960
MEASURING DEVICE
Filed Nov. 2, 1940   2 Sheets-Sheet 2

INVENTOR
Vallie G. Tice
BY
ATTORNEY

Patented Dec. 30, 1941

2,267,960

UNITED STATES PATENT OFFICE 2,267,960

MEASURING DEVICE

Vallie G. Tice, Allentown, Pa.

Application November 2, 1940, Serial No. 364,001

1 Claim. (Cl. 33—149)

The present invention relates to devices for measuring the length of a column of material in a vertically extending container having graduations, and has more particularly reference to a device for measuring the fatty content of milk or cream or other animal or vegetable substances.

Figure 1:
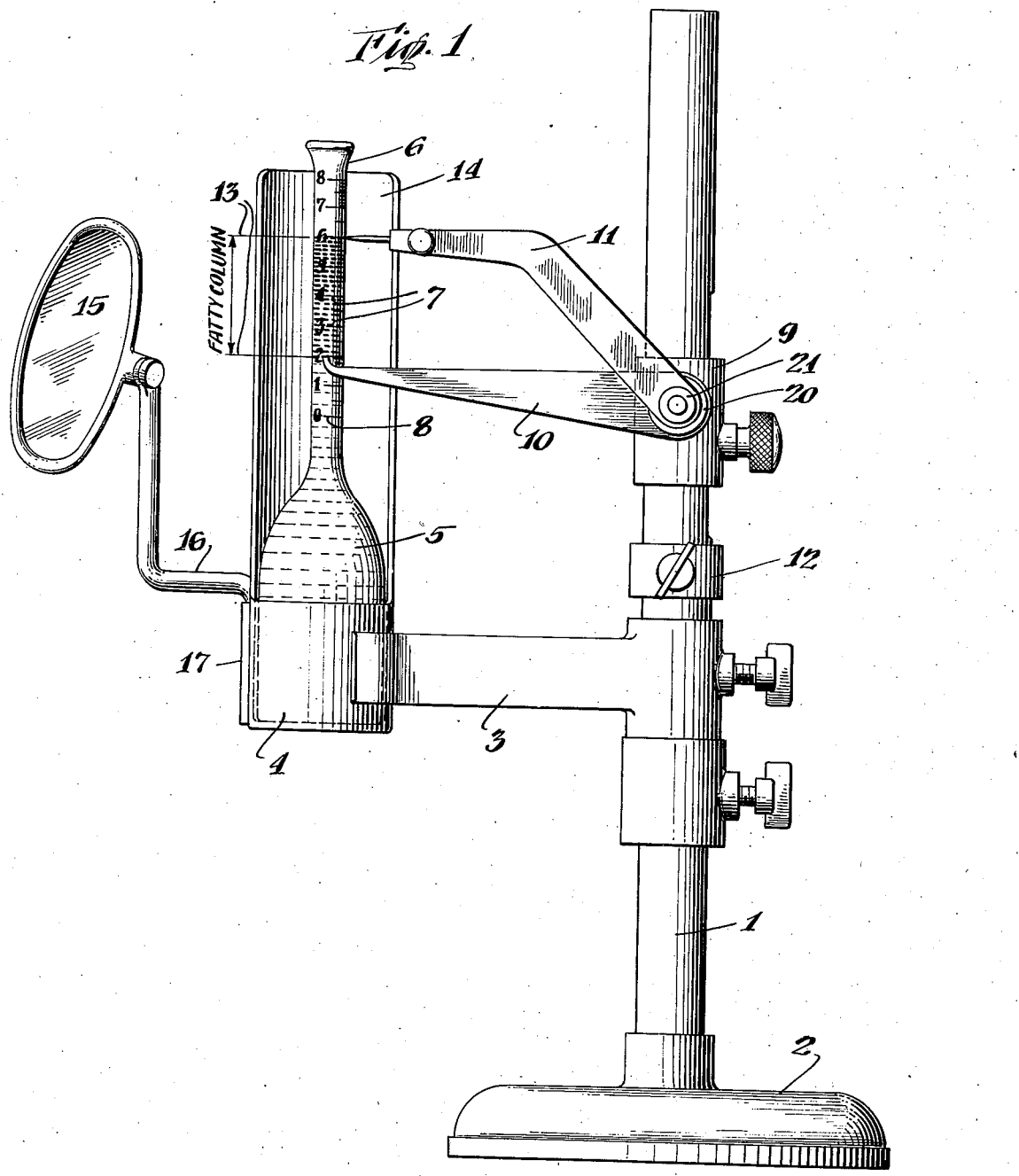
Figure 2:
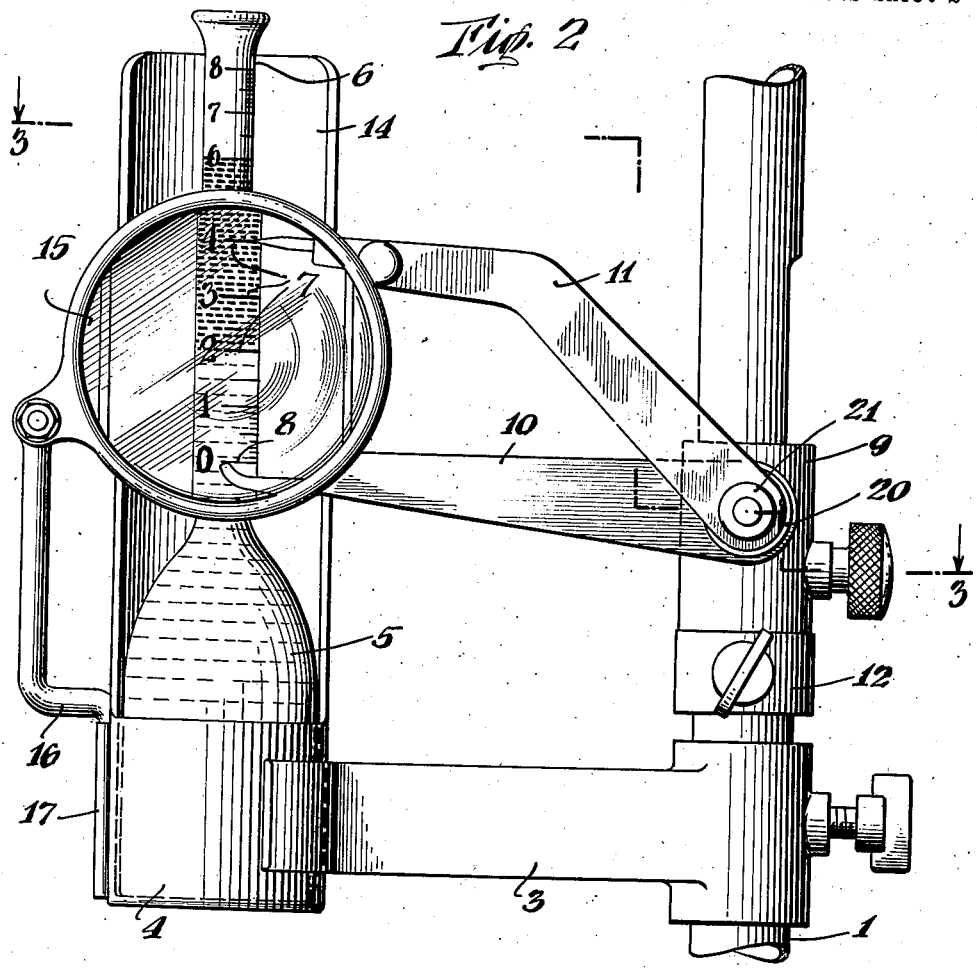
Figure 3:
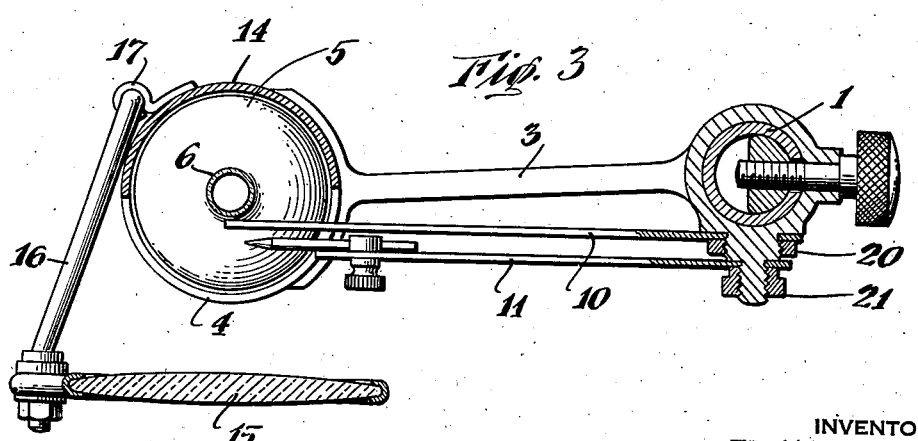

In the accompanying drawings the invention is disclosed in a concrete and preferred form in which Fig. 1 is a view in side elevation of a device embodying the invention, with the parts occupying one position;

Fig. 2 is a view of a portion of Fig. 1, with the parts occupying another position; and Fig. 3 is a transverse sectional view substantially on the plane of line 3—3 of Fig. 1.

In the art of ascertaining the fatty content of substances, it is customary, in the care of milk for instance, to place the milk sample in a translucent flask or container having a vertically extending neck provided with graduations, such containers being generally known under the name of "Babcock Test Bottle." The milk sample is mixed with sulphuric acid, and the container is subjected to the action of a centrifuge whereby the fatty content rises to the top and is thus separated, and is visible and distinguishable, from the remainder of the liquid of the container. A little water is then added to the contents to bring the column of fatty substance well up within the amplitude of the graduations of the neck of the container.

As the fatty content of different samples varies, it is not possible to predetermine the exact position of the fatty column within the neck of the container. The temperature of the contents of the container during the separating process rises to about 140° F. and is kept at that temperature by immersing the container in hot water until the length of the column of fatty material can be measured, and in consequence the operator wears gloves during the measuring operation. Nevertheless, the measurement must be painfully exact because the price which the farmer receives for his milk depends upon the amount of its fatty content. The number of samples to be tested at a time runs into the hundreds; five hundred samples is not an unusual number. It will be apparent from the foregoing that to make accurate tests under the conditions above mentioned is an exceedingly difficult, slow and wearisome task.

The object of the invention is the provision of an exceedingly simple device whereby the tests can be made more expeditiously than heretofore and with equal if not greater accuracy.

I indicates a vertical support or post mounted on a suitable base 2. 3 is a bracket mounted to swing in a horizontal plane around post I. The outer end of the bracket constitutes a holder 4 to support a container 5 for the sample of milk to be tested. Said container is shown here as the conventional "Babcock Test Bottle" that has a long vertical neck 6 of relatively small diameter and provided with graduations 7 to indicate the fatty content. The zero point of the graduations or scale is denoted at 8. 9 is a carrier, mounted to slide in a vertical direction on post I.

10 and 11 indicate the two legs of a caliper that is mounted on the carrier. These legs extend from a common center, as shown, but nevertheless approach any two spaced graduations on the container in a nearly horizontal direction. This is accomplished in the present instance by shaping upper leg 11 with an angular bend as shown. Lower leg 10 is preferably stationary, that is to say: it can be either absolutely fixed or it can be adjustable and thereafter held in its adjusted position as by a clamping nut 20. Upper leg 11, on the other hand, is held only with such friction, by nut 21 for example, as to enable it to be readily adjusted during the measuring operation and to thereafter hold its position during the reading of the fatty content against the graduations. 12 indicates an abutment associated with post I, being in the present case fixed directly thereto.

The column of fat is indicated at 13. To measure the length of this column, carrier 9 is moved upwardly away from abutment 12 until lower leg 10 of the caliper is in line with the lower end of column 13. Carrier 9 now being held stationary as by friction, upper leg 11 is adjusted to be in line with the top of column 13 (see Fig. 1). The length of column 13 having thus been established by means of the caliper, carrier 9 is moved down until it comes against abutment 12. The parts are so arranged that when carrier 9 occupies the position against abutment 12, the outer end of lower leg 10 is in line with zero point 8 of the graduations on the neck of the container and the length of column 13 can now easily be read on the scale of the neck of the container (see Fig. 2).

To assist the operator in more clearly reading the scale, a light reflecting shield 14 forms a part of holder 4, and the magnifying glass 15 is mounted on a bent arm 16 that swings in a horizontal plane in sleeve 17 of the bracket, whereby said glass can be swung into position on that side of the caliper that is opposite to that on which the container is located.

I claim:

In a device for measuring the length of a column of material in a vertically extending container having graduations, regardless of the position of said column above the zero point of said graduations, and in which a holder sustains the container, a vertical support adjacent the holder for said container; an abutment member associated with said support; a carrier on said support, above said abutment, vertically movable toward and away from said abutment; a caliper on said carrier, the legs of which caliper extend from a common center, at least one of said legs having a reverse angular bend to thereby enable both of said legs to approach any two spaced graduations on said container in a nearly horizontal direction, the lower leg of said caliper being stationary and the upper leg of said caliper being adjustable, the end of said lower leg of said caliper being in line with the zero point of said graduations when said carrier is in contact with said abutment.

VALLIE G. TICE.